J. H. HAMMOND, Jr.
SYSTEM OF TELEDYNAMIC CONTROL.
APPLICATION FILED FEB. 25, 1913. RENEWED OCT. 24, 1918.

1,420,256.

Patented June 20, 1922.

WITNESSES

INVENTOR

ATTORNEYS

J. H. HAMMOND, Jr.
SYSTEM OF TELEDYNAMIC CONTROL.
APPLICATION FILED FEB. 25, 1913; RENEWED OCT. 24, 1918.
1,420,256. Patented June 20, 1922.
2 SHEETS—SHEET 2.
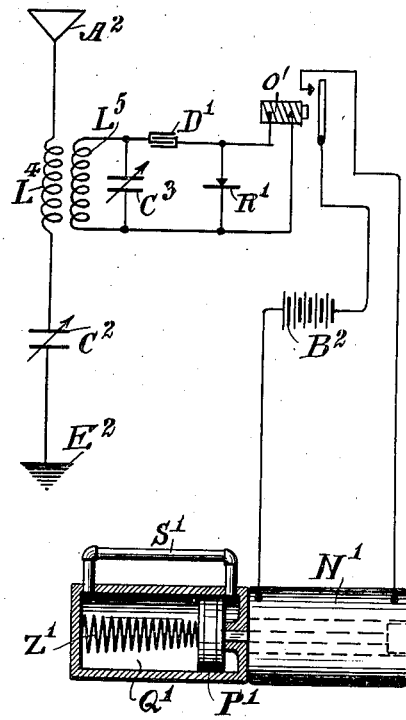
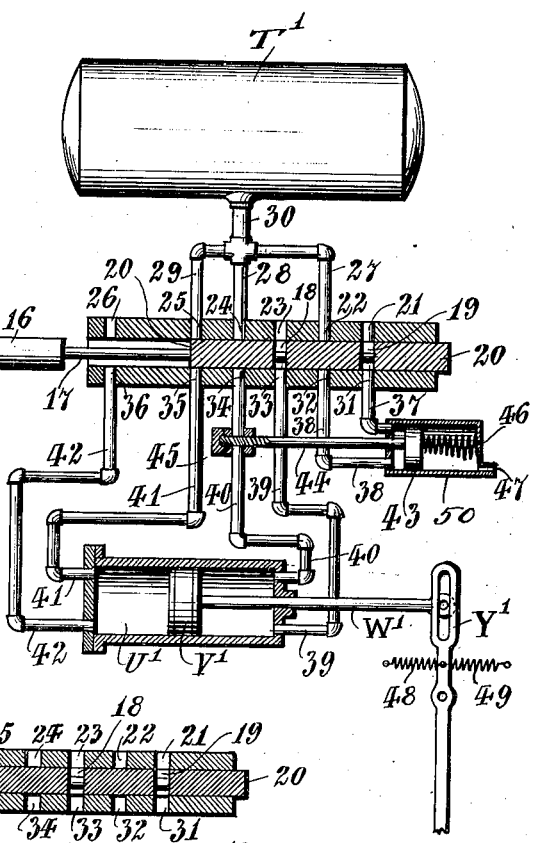
Fig. 3.
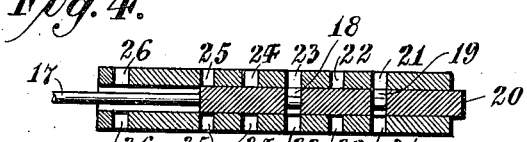
Fig. 4.
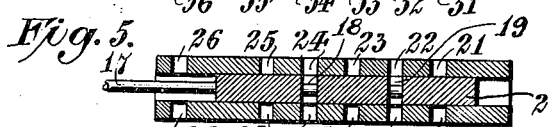
Fig. 5.
Fig. 6.
WITNESSES
INVENTOR
BY
ATTORNEYS

UNITED STATES PATENT OFFICE.

JOHN HAYS HAMMOND, JR., OF GLOUCESTER, MASSACHUSETTS.

SYSTEM OF TELEDYNAMIC CONTROL.

1,420,256.  Specification of Letters Patent.  Patented June 20, 1922.

Application filed February 25, 1913, Serial No. 750,705. Renewed October 24, 1918. Serial No. 259,543.

*To all whom it may concern:*

Be it known that I, JOHN HAYS HAMMOND, Jr., a citizen of the United States, residing at Gloucester, in the State of Massachusetts, have invented certain new and useful Improvements in Systems of Teledynamic Control, of which the following is a specification, reference being had to the accompanying drawings, forming a part hereof.

This invention relates to systems for the control of mechanisms at a distance by means of radiant energy, and relates more particularly to systems in which radiant energy transmitted from a distant station actuates electrical receiving apparatus, which causes the operation of mechanisms worked by fluids under pressure.

I have discovered that when a series of wave impulses is sent out from a transmitting station, the position of a plunger, or movable core in an electromagnet at a receiving station can be controlled by the frequency of the impulses. When no impulses are received by the electromagnet, the plunger is not attracted, and when impulses are received, the attraction of the electromagnet for the plunger will depend upon the frequency of the impulses; the greater the frequency, the greater the attraction. The frequency of the impulses sent out from the transmitting station can be controlled in various ways, for instance, by sending out a continuous train of waves and then varying the amplitude of the waves by changing the inductance or the capacity of the antenna circuit at any frequency desired. The electric waves may also be sent out in groups, and the group frequency varied, as shown for instance in my copending application, Serial No. 693,380, filed April 26, 1912.

In any of these ways the attraction of the electromagnet for its plunger may be varied, and hence the position of the plunger can be controlled, and any mechanism attached to the plunger can likewise be controlled.

In the accompanying drawings, Fig. 1 shows in diagrammatic form, a transmitting station on my system with means for varying the frequency of the wave impulses sent out.

Fig. 3 shows, partly diagrammatically, a modified form of receiving station.

Figs. 4, 5 and 6 shows details of part of the mechanism of my receiving station shown in Fig. 3.

Figure 1:
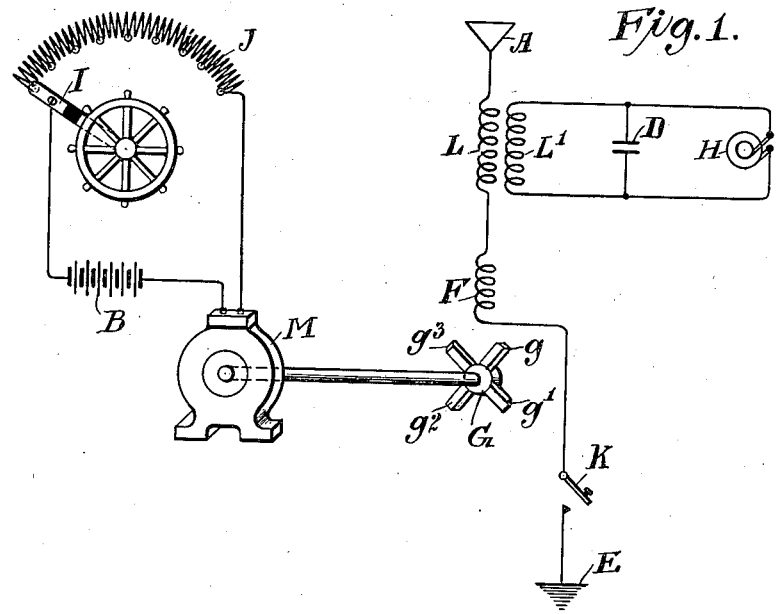

In Fig. 1, a high-frequency alternator H impresses oscillations upon the antenna A by means of the coils $L^1$ and L. D is a condenser, connected as shown. In circuit with the antenna A are the inductance coils L and F, the key or switch K and the ground E. A rotary element G, having pole pieces $g$, $g^1$, $g^2$ and $g^3$ composed of iron or other magnetic substance, is in proximity to the coil F, so that when G is rotated, periodic variations are caused in the inductance of F, and hence in the inductance of the antenna circuit. These variations in inductance will cause corresponding variations in the resonance between the antenna circuit and the oscillation generator, and will therefore cause the radiation of electric waves of periodically varying amplitude, the frequency of the amplitude variations being dependent upon the speed of the rotary element G and the number of its pole pieces.

Mechanically connected with the rotary element G is the electric motor M. In circuit with the motor M are the battery B and the rheostat J. The rheostat arm I can be moved over the rheostat J so as to vary the resistance of the circuit B I J M, and hence vary the current flowing through the motor M, and hence the speed of the motor.

Figure 2:
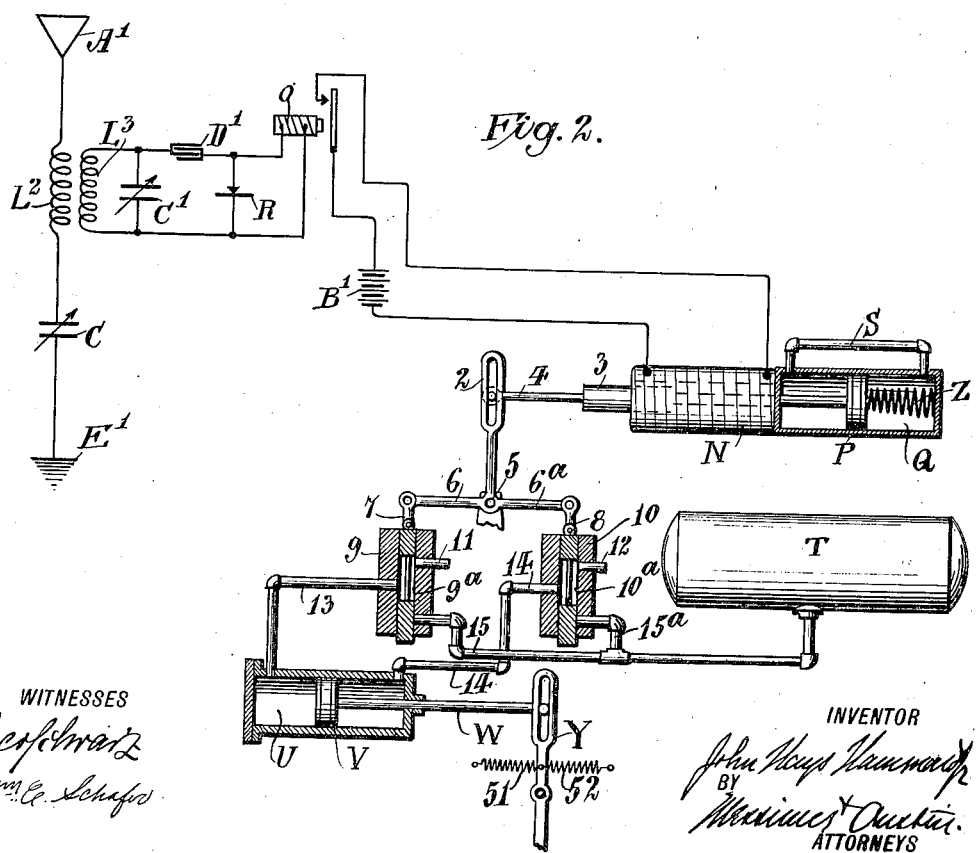
Fig. 2 shows, partly in diagrammatic form, a receiving station on my system, containing electrical apparatus and fluid-operated mechanism.

In Fig. 2, $A^1$ is a receiving antenna, in circuit with inductance coil $L^2$ and variable condenser C, and grounded at $E^1$. This antenna circuit is in tune with the high-frequency generator H at the transmitting station, and also with the oscillation circuit $L^3$ $C^1$, comprising the inductance coil $L^3$ and the variable condenser $C^1$, to which it is coupled by the coils $L^2$ and $L^3$. By means of the stopping condenser $D^1$ and the rectifier R, unidirectional current impulses are supplied to the relay O. When the relay O is operated by these current impulses, it permits current from the battery $B^1$ to pass through the electromagnet N. The plunger or movable core 3 is subject to the attraction of the electromagnet N, and is connected to the piston P which travels in the cylinder Q. The pipe S connects the two ends of the cylinder and as it is so small as to prevent the rapid movement of air or other fluid, the motion of the piston is retarded. The compression spring Z restores the piston P and plunger 3 to their original positions when the attraction of the electromagnet ceases.

Attached to the plunger 3 is the rod 4, which is connected with the slotted oscillating arm 2 of the bent rocking lever 2, 6, $6^a$, which is pivoted at 5. Connected to the ends of the arms 6 and $6^a$, respectively, are the valve stems 7 and 8, which are attached to the movable parts of the valves 9 and 10, respectively. The tank T, containing a fluid under pressure, is connected by means of the pipes 15 and $15^a$ with the valves 9 and 10, respectively. Pipe 13 leads from valve 9 to one end of the cylinder U, and pipe 14 leads from valve 10 to the other end of cylinder U. Exhaust pipes 11 and 12 lead to the outer air from valves 9 and 10, respectively. Piston V travels in cylinder U and is attached to piston rod W, which is connected with helm Y, the latter operating a rudder or other element, not shown.

When the received electrical impulses are of a certain definite frequency, the plunger 3 will be held in a central position by the attraction of the electromagnet N, the bent rocking lever 2, 6, $6^a$ will be in its central position, and the valves 9 and 10 will be in their neutral or inoperative condition. Pipes 15 and $15^a$ will both be closed, while the left end of cylinder U will be in communication with the outer air through pipe 13, port $9^a$ and pipe 11 and the right end of cylinder U will be in communication with the outer air through pipe 14, port $10^a$ and pipe 12. Piston V and helm Y will also be in their central positions. When the frequency of the received electrical impulses increases, the plunger 3 will be attracted still more by the electromagnet N and will draw the slotted arm 2 to the right. Arm 6 will be elevated, arm $6^a$ depressed; valve stem 7 will move up and valve stem 8 will move down. Pipe $15^a$ will be opened, pipe 12 will be closed, pipe 15 will remain closed, and pipe 11 will remain open. The compressed fluid in tank T will pass through the pipe $15^a$ and through port $10^a$ to pipe 14 and so into the right end of cylinder U, while the left end of cylinder U will be connected with the outer air through pipe 13, port $9^a$ and pipe 11. The piston V will therefore be caused to travel to the left, and the piston rod W will draw helm Y to the left.

When the frequency of the received electrical impulses decreases, the plunger 3 will be attracted less by electromagnet N and will move to the left under the influence of spring Z and will push the slotted arm 2 to the left. Arm 6 will be depressed, arm $6^a$ elevated; valve stem 7 will move down and valve stem 8 will move up. Pipes 12 and 15 will be opened, while pipes 11 and $15^a$ will be closed.

The compressed fluid in tank T will pass through pipe 15 and through port $9^a$ to pipe 13 and so into the left end of cylinder U, while the right end of cylinder U will be connected with the outer air through pipe 14, port $10^a$ and pipe 12. The piston V will therefore be caused to travel to the right and the piston rod W will push helm Y to the right. When the valves 9 and 10 return to their neutral or inoperative positions, both ends of cylinder U will be open to the outer air, and helm Y and piston V will return to their central positons under the influence of springs 51 and 52.

In the apparatus just described, the motion of the plunger 3 is retarded by means of the piston P, which can move only slowly on account of the air or other fluid in cylinder Q, and when the electrical impulses cease entirely, the plunger 3 moves to its extreme left position and the helm Y remains in its extreme right position. In order that the helm shall occupy a central position, it is necessary that the received electrical impulses shall have a certain definite frequency, and this of course necessitates a continuous operation of the transmitting station.

A preferred form of my invention, in which the helm occupies a central position when the transmitting station is inactive, is shown in Fig. 3, where $A^2$ is a receiving antenna in circuit with the inductance coil $L^4$ and the veriable condenser $C^2$, and grounded at $E^2$. This antenna circuit is in tune with the high-frequency generator H at the transmitting station, and also with the oscillation circuit $L^5 C^3$, comprising the inductance coil $L^5$ and the variable condenser $C^3$, to which it is coupled by the coil $L^4$ and $L^5$. By means of the stopping condenser $D^1$ and the rectifier $R^1$, unidirectional current impulses are supplied to the relay $O^1$. When the relay $O^1$ is operated by these current impulses, it permits current to pass from the battery $B^2$ through the electromagnet $N^1$. The plunger or movable core 16 is subject to the attraction of the electromagnet $N^1$, and is connected to the piston $P^1$ which travels in the cylinder $Q^1$. The pipe $S^1$ connects the two ends of the cylinder, and as it is so small as to prevent the rapid movement of air or other fluid, the motion of the piston is retarded. The compression spring $Z^1$ restores the piston $P^1$ and plunger 16 to their original positions when the attraction of the electromagnet ceases.

Connected to the plunger 16 is the valve stem 17 which is attached to the valve 20. The movable part of the valve contains the ports 18 and 19, the upper fixed portion of the valve contains the ports 21, 22, 23, 24, 25 and 26, and the lower fixed portion of the valve contains the ports 31, 32, 33, 34, 35 and 36, opposite, respectively, to ports 21, 22, 23, 24, 25 and 26. $T^1$ is a tank containing air or some other fluid under pressure. Pipe 30 leads from tank $T^1$ and has branches 27, 28 and 29, leading, respectively, to ports 22, 24 and 25. $U^1$ is a cylinder, in which piston $V^1$ travels. Piston rod $W^1$ is attached to piston $V^1$ and connected with helm $Y^1$. Helm $Y^1$ is connected with a rudder or other elements, not shown. Springs 48 and 49 tend to keep the helm $Y^1$ in a central position.

Pipes 39 and 40 lead from ports 33 and 34, respectively, to the right end of cylinder $U^1$, and pipes 41 and 42 lead from ports 35 and 36, respectively, to the left end of cylinder $U^1$. An auxiliary cylinder 50 has a piston 43, which is connected by means of the piston rod 44 with the valve 45, which normally closes the pipe 40, owing to the pressure of the spring 46 on the piston 43. A narrow outlet 47 in the cylinder 50 prevents air in the right end of the cylinder from escaping or entering rapidly, and so retards the movement of piston 43. Pipes 37 and 38 lead from ports 31 and 32, respectively, to the left end of cylinder 42.

The operation of this form of my invention may be understood from Fig. 3 and from Figures 4, 5 and 6, the latter three showing three different positions of the valve 20. When no electric impulses are being received at the receiving station, the electromagnet $N^1$ is de-energized and the plunger 16 is not attracted. The valve 20 is therefore in the position shown in Figures 3 and 4. The port 18 is opposite ports 23 and 33, so that the right end of cylinder $U^1$ is in free communication with the outer air through pipe 39. The port 19 is opposite ports 21 and 31, so that the left end of auxiliary cylinder 50 is in free communication with the outer air through pipe 37. The left end of cylinder $U^1$ is also in free communication with the outer air through pipe 42 and ports 36 and 26. Ports 22, 24, 25, 32, 34 and 35 are all closed, so that no fluid from tank $T^1$ can enter cylinder $U^1$ or auxiliary cylinder 50. The system is therefore at rest, and the helm $Y^1$ is in a central position.

When electrical impulses of a certain definite frequency are received, the electromagnet $N^1$ will be energized to a certain degree and will attract the plunger 16 to a certain extent, so that the valve 20 will be moved to the position shown in Fig. 5. In this position the port 19 is opposite ports 22 and 32, so that the fluid in tank $T^1$ will flow through pipes 30, 27 and 38 into the left end of cylinder 50. Piston 43 will move slowly to the right, its motion being retarded by the slow passage of air through the outlet 47, and will slowly open auxiliary valve 45 in pipe 40. Ports 21 and 31 are closed, so that no fluid can escape from cylinder 50 through pipe 37. Port 18 is opposite ports 24 and 34, so that, when valve 45 is open, the fluid from tank $T^1$ will pass through pipes 30, 28 and 40 into the right end of cylinder $U^1$. Ports 23 and 33 are closed, so that no fluid can escape from the right end of cylinder $U^1$ through pipe 39. Ports 25 and 35 are also closed, so that no fluid from tank $T^1$ can enter the left end of cylinder $U^1$, and ports 26 and 36 are open, so that the left end of cylinder $U^1$ is in free communication with the outer air through pipe 42. Under these circumstances, the piston $V^1$ will be forced toward the left and, by means of the piston rod $W^1$, will pull the helm $Y^1$ to the left.

When electrical impulses of another definite frequency, higher than that in the case last described, are received, the electromagnet will be energized to a greater degree than before, and will attract the plunger 16 to a greater extent, so that the valve 20 will be moved to the position shown in Fig. 6. In this position, the port 18 will be opposite ports 25 and 35, so that the fluid from tank $T^1$ will pass through pipes, 30, 29 and 41 into the left end of cylinder $U^1$. Ports 26 and 36 are closed, so that no fluid can escape from the left end of cylinder $U^1$ through pipe 42. Ports 24 and 34 are closed, so that no fluid from tank $T^1$ can enter the right end of cylinder $U^1$, and port 19 is opposite ports 23 and 33, so that the right end of cylinder $U^1$ is in free communication with the outer air through pipe 39. Ports 22 and 32 are closed, so that no fluid from tank $T^1$ can enter the left end of auxiliary cylinder 50, and ports 21 and 31 are open, so that the left end of cylinder 50 is in free communication with the outer air through pipe 37. The spring 46 will therefore force piston 43 to the right, and valve 45 in pipe 40 will be closed, if it is not already closed. Under these circumstances, the piston $V^1$ will be forced to the right, and, by means of the piston rod $W^1$, will push the helm $Y^1$ to the right.

When it is desired to reach this third, or last position of the mechanism at once from the initial position, so as to move the helm $Y^1$ to the right without first moving the helm to the left, electrical impulses of the proper frequency for the third position are sent. The plunger 16 and the valve 20, starting from their initial positions, will move through their second positions quickly to the third positions. But when valve 20 moves through its second position quickly, and ports 22, 32, 24 and 34 are momentarily opened, piston 43 in auxiliary cylinder 50, owing to the resistance offered to the exit of the air from the right end of cylinder 50 through outlet 47, will not have time to move to the right far enough to open valve 45 in pipe 40 until ports 22, 32, 24 and 34 are again closed, and the fluid from tank $T^1$ will not be able to enter the right end of cylinder $U^1$, and the piston $V^1$ and helm $Y^1$ will not be moved to the left. But when valve 20 has finally reached its third position, the piston V¹ and helm Y¹ will be moved to the right, as above described.

In these specifications, the terms "up" and "down" and "right" and "left," used in describing the operation of my invention, refer to the particular arrangement of apparatus shown in the drawings, and might, of course, be changed with some other arrangement of the apparatus.

Instead of varying the amplitude of the transmitted waves by varying the inductance of the antenna circuit, I can vary the amplitude by varying the capacity of the antenna circuit or the mutual inductance between the antenna circuit and the circuit of the high-frequency oscillation generator, or in other ways, and in general, I do not confine myself to the particular apparatus and mechanisms here shown, but changes and modifications, within the knowledge of those skilled in the art, may be made in the apparatus shown and described herein, without departing from the spirit of my invention, provided the means set forth in the following claims be employed.

Having thus described my invention, I claim:—

1. A receiving system for radiant energy, comprising means responsive to impulses of radiant energy in varying degrees depending upon the frequency of said impulses.

2. In a system for the distant control of mechanisms, a transmitting station comprising means for sending out electrical impulses of various predetermined frequencies, and a receiving station comprising means responsive to electrical impulses in proportion to the frequency of said impulses, and mechanisms controlled by said responsive means.

3. In a system for the control of mechanisms at a distance, a transmitting station comprising means for sending out electrical impulses of various predetermined frequencies, and a receiving station comprising an electromagnet whose tractive power varies in proportion to the frequency of the received electrical impulses, and mechanism controlled by said electromagnet.

4. In a system for the control of mechanisms at a distance, a transmitting station comprising means for sending out electrical impulses of various predetermined frequencies, and a receiving station comprising an electromagnet whose tractive power varies in proportion to the frequency of the received electrical impulses, a plunger under the tractive power of said electromagnet, and mechanism controlled by said electromagnet and plunger and operated by fluid under pressure.

5. In a system for the distant control of mechanisms, a transmitting station, and a receiving station comprising a solenoid whose tractive power varies in proportion to the frequency of the electrical impulses sent out from the transmitting station, a plunger under the tractive power of said solenoid, and mechanism controlled by said electromagnet and plunger and operated by a fluid.

6. In a system for the distance control of mechanisms, a transmitting station comprising means for emitting a continuous train of electric waves and means for successively increasing and decreasing the amplitude of said waves selectively at any one of a plurality of frequencies, and a receiving station comprising means responsive to variations in the amplitude of the received waves in proportion to the frequency of said amplitude variations, and mechanisms controlled by said responsive means.

7. In a system for the distance control of mechanisms, a transmitting station comprising means for emitting a continuous train of high-frequency electric waves and means for varying the amplitude of said waves, and a receiving station comprising means responsive to variations in the amplitude of the received waves in proportion to the frequency of said amplitude variations, mechanisms controlled by said responsive means, and means for delaying the action of said mechanisms.

8. In a system for the control of mechanisms at a distance, a transmitting station capable of emitting continuous and unbroken high-frequency electrical oscillations and of varying the intensity of said oscillations, and a receiving station comprising apparatus capable of responding in different degrees in proportion to the said variations of the electrical energy at the transmitter, valve mechanisms controlled by said apparatus, fluid-operated mechanisms controlled by said valve mechanisms and means whereby any position of said fluid-operated mechanisms can be attained independently of the other positions.

9. In a system of distant control, the combination with means operative to emit electrical impulses at a predetermined frequency, of means operative to vary said frequency, and receiving means responsive to said impulses in varying degrees depending upon the frequency of said impulses.

10. In a system of distant control, the combination with means operative to emit electrical impulses at a predetermined frequency, of means operative to vary said frequency selectively, and receiving means responsive to said impulses in varying degrees depending upon the frequency of said impulses.

11. In a system of distant control, the combination with means operative to emit radiant impulses selectively at any one of a plurality of predetermined frequencies, of means responsive to said impulses in varying degrees depending upon the frequency of said impulses.

12. The method of distant control, which consists in generating electrical impulses at a predetermined frequency, varying said frequency and causing receiving means to respond to said impulses in varying degrees depending upon the frequency of the said impulses.

13. The method of distant control, which consists in generating electrical impulses at a predetermined frequency, selectively varying said frequency and causing receiving means to respond to said impulses in varying degrees depending upon the frequency of said impulses.

14. The method of distant control, which consists in generating a continuous train of electrical oscillations alternately increasing and decreasing the amplitude of said oscillations at a predetermined periodicity, varying said perdiodicity and causing receiving means to respond to said oscillations in varying degrees proportionate to the variations in said periodicity.

15. In a system of distant control, the combination with means operative to emit a continuous train of electrical oscillations, of means automatically operative to alternately increase and decrease the amplitude of said waves at a predetermined periodicity, means selectively operative to vary said periodicity, and means responsive to said oscillations in varying degrees proportional to the variations in said periodicity.

16. In a system of distant control, the combination with means operative to emit a continuous train of electrical oscillations, of means automatically operative to alternately increase and decrease the amplitude of said waves at a predetermined periodicity, means selectively operative to vary said periodicity, and electromagnetic reciprocatory means responsive to said oscillations in varying degrees proportional to the variations in said periodicity.

17. In a system of distant control, the combination with means operative to emit radiant impulses at a predetermined frequency, of means operative to vary said frequency, and receiving means responsive to said impulses in varying degrees depending upon the frequency of said impulses.

18. In a system of distant control, the combination with means operative to emit radiant impulses at a predetermined frequency, of means operative to vary said frequency selectively, and receiving means responsive to said impulses in varying degrees depending upon the frequency of said impulses.

19. In a system of distant control, the combination with means operative to emit electroradiant impulses at a predetermined frequency, of means operative to vary said frequency, and receiving means responsive to said impulses in varying degrees depending upon the frequency of said impulses.

20. In a system of distant control, the combination with means operative to emit electroradiant impulses at a predetermined frequency, of means operative to vary said frequency selectively, and receiving means responsive to said impulses in varying degrees depending upon the frequency of said impulses.

21. In a system of distant control, the combination with means operative to emit a continuous train of radiant oscillations, of means automatically operative to alternately increase and decrease the amplitude of said waves at a predetermined periodicity, means selectively operative to vary said periodicity, and means responsive to said oscillations in varying degrees proportional to the variations in said periodicity.

22. In a system of distant control, the combination with means operative to emit a continuous train of radiant oscillations, of means automatically operative to alternately increase and decrease the amplitude of said waves at a predetermined periodicity, means selectively operative to vary said periodicity and electromagnetic reciprocatory mean responsive to said oscillations in varying degrees proportional to the variations in said periodicity.

23. In a system of distant control, the combination with means operative to emit a continuous train of electroradiant oscillations, of means automatically operative to alternately increase and decrease the amplitude of said waves at a predetermined periodicity, means selectively operative to vary said periodicity, and means responsive to said oscillations in varying degrees proportional to the variations in said periodicity.

24. In a system of distant control, the combination with means operative to emit a continuous train of electroradiant oscillations, of means automatically operative to alternately increase and decrease the amplitude of said waves at a predetermined periodicity, means selectively operative to vary said periodicity, and electromagnetic reciprocatory means responsive to said oscillations in varying degrees proportional to the variations in said periodicity.

This specification signed and witnessed this 19th day of February, A. D. 1913.

JOHN HAYS HAMMOND, Jr.

Signed in the presence of—
Geo. Schwarz,
M. P. Winne.